United States Patent
Watzal et al.

(10) Patent No.: US 11,014,749 B2
(45) Date of Patent: May 25, 2021

(54) ACCUMULATING CONVEYOR

(71) Applicant: Bleichert Automation GMBH & Co. KG, Osterburken (DE)

(72) Inventors: Steffen Watzal, Osterburken (DE); Hubert Schwab, Osterburken (DE)

(73) Assignee: Bleichert Automation GMBH & Co. KG

( * ) Notice: Subject to any disclaimer, the term of this patent is extended or adjusted under 35 U.S.C. 154(b) by 180 days.

(21) Appl. No.: 16/345,070

(22) PCT Filed: Oct. 27, 2017

(86) PCT No.: PCT/EP2017/077617
§ 371 (c)(1),
(2) Date: Apr. 25, 2019

(87) PCT Pub. No.: WO2018/078105
PCT Pub. Date: May 3, 2018

(65) Prior Publication Data
US 2019/0248585 A1    Aug. 15, 2019

(30) Foreign Application Priority Data

Oct. 28, 2016   (DE) .................... 102016120710.1

(51) Int. Cl.
*B65G 17/00* (2006.01)
*B65G 35/06* (2006.01)
(Continued)

(52) U.S. Cl.
CPC .......... *B65G 17/002* (2013.01); *B65G 35/06* (2013.01); *B65G 47/29* (2013.01); *B65G 47/88* (2013.01)

(58) Field of Classification Search
CPC ........ B65G 47/26; B65G 35/06; B65G 19/02; B65G 17/34; B65G 17/002; B65G 17/067; B65G 17/48; B65G 47/88; B65G 47/29
(Continued)

(56) References Cited

U.S. PATENT DOCUMENTS 3,722,656 A    3/1973  Loomis et al.
4,739,261 A *  4/1988  Sugiyama .......... G01N 27/9046
                                        324/227

(Continued)

FOREIGN PATENT DOCUMENTS

DE    39 18 087 A1    2/1990
DE    201 14 801 U1   2/2002
(Continued)

*Primary Examiner* — James R Bidwell
(74) *Attorney, Agent, or Firm* — Steve LeBlanc, LLC

(57) ABSTRACT

An accumulating conveyor includes upper and lower runs which form upper and lower tracks, reverse sections connecting the upper and lower runs, and a deflecting element connected to a first motor. Endless tension elements engaged with a deflecting element circulate a pallet in the upper and lower runs. A stop element is on the underside of the pallet, and a stopping element is arranged between the upper and lower runs and driven by a second motor. The stopping element has a locking position with the stop element for stopping the pallet and a release position with the stop element for conveying the pallet. The stopping element is guided in sections around the stop element on a curved path during movement from the locking position to the release position to release the pallet for further conveying.

15 Claims, 7 Drawing Sheets

(51) Int. Cl.
*B65G 47/29* (2006.01)
*B65G 47/88* (2006.01)

(58) Field of Classification Search
USPC .................. 198/345.1, 345.2, 465.1, 795
See application file for complete search history.

(56) References Cited

U.S. PATENT DOCUMENTS

| | | | | |
|---|---|---|---|---|
| 5,735,384 | A * | 4/1998 | Lingo | B65G 17/002 |
| | | | | 198/343.1 |
| 6,568,525 | B2 * | 5/2003 | Stone | B65G 17/002 |
| | | | | 198/803.2 |
| 6,868,959 | B2 * | 3/2005 | Thomas | B65G 35/06 |
| | | | | 198/343.1 |
| 8,820,518 | B2 * | 9/2014 | Pac Gracia | B65G 17/002 |
| | | | | 198/795 |
| 9,315,326 | B2 | 4/2016 | Magni et al. | |
| 9,758,306 | B2 | 9/2017 | Schirle et al. | |
| 2014/0054134 | A1 * | 2/2014 | Pac Gracia | B65G 17/002 |
| | | | | 198/459.1 |

FOREIGN PATENT DOCUMENTS

| | | | |
|---|---|---|---|
| DE | 20 2005 014 860 U1 | 5/2006 | |
| DE | 20 2011 108545 U1 | 1/2012 | |
| DE | 10 2010 056 035 A1 | 6/2012 | |
| DE | 10 2014 106956 A1 | 11/2015 | |
| DE | 10 2016 103 211 A1 | 8/2017 | |
| EP | 1 484 267 A2 | 8/2004 | |
| EP | 2096053 * | 2/2009 | ............ B65G 47/26 |
| JP | S52 43275 A | 4/1977 | |
| JP | S58 113020 A | 7/1983 | |
| WO | WO 2004/000698 A1 | 12/2003 | |

* cited by examiner

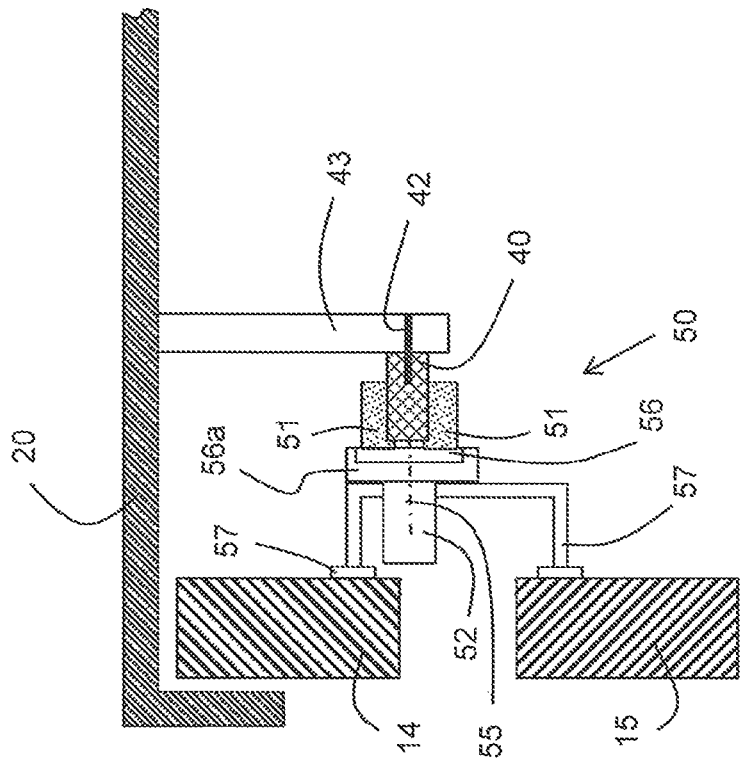
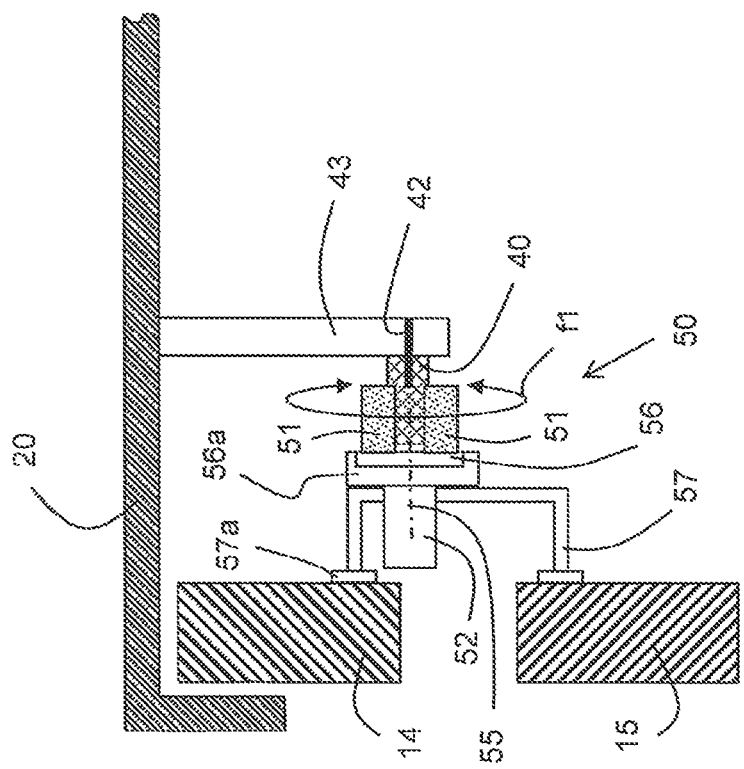

ACCUMULATING CONVEYOR

PRIORITY CLAIMS

This application claims priority to PCT application PCT/EP2017/077617 filed Oct. 27, 2017, which claims priority to German Patent Application Number 10 2016 120 710.1 filed Oct. 28, 2016.

FIELD OF THE INVENTION

The invention relates to an accumulation conveyor according to the generic term of claim 1.

BACKGROUND OF THE INVENTION

Such accumulating conveyors have long been known, for example from DE 10 2014 106 956 A1. In the upper run, workpieces placed on the circulating pallets—also known as workpiece carriers—are transported from one location to another. The workpieces are, for example, assembly parts for vehicle production, which are transported to an assembly line by means of the pallets. Arriving at the assembly line, the workpieces are taken off by a robot, for example, and processed by production machines. In general, such accumulating conveyors are provided at various locations and for a wide variety of applications.

The tension elements are usually designed as endless transport chain or transport chains which circulate in the two side sections of the aforementioned accumulation conveyor. To drive the transport chains, chain wheels are provided, which are arranged in the two reverse sections, wherein at least one of the chain wheels is directly or indirectly motor-driven.

In the abovementioned known accumulation conveyor, there is a gear wheel coupled with a hysteresis coupling or viscous coupling on each side of a pallet (seen in transverse transport direction). The two gear wheels engage in the respective transport chain in the corresponding side section. The gear wheel does not rotate when the pallet is transported unhindered, but acts like a rigid pin that takes the pallet with it.

The pallet is also driven in the reverse sections by means of the gear wheels mentioned above. The transport chains of this well-known device are each double-rowed or double-drawn, with each of these two rows rigidly coupled to the other. Both transport chains are each driven by a chain wheel, wherein this chain wheel, however, only engages in one chain, so that one chain strand remains free. Within this chain strand, the respective gear wheel of the pallet then runs off, so that it is constantly in contact with this row of transport chains.

The familiar pallet also has a track roller or a track wheel on its underside in each of the four corners, with these rollers running in or on rails along the two strands, which positively guide the track rollers and thus secure the pallet. In addition, a latch is mounted centrally underneath each pallet, which in each reverse section forms a positive or frictional connection with a revolving chain located centrally in each reverse section, ensuring safe movement of the pallet in the reverse section.

If an obstacle prevents a pallet from continuing its journey, in particular another pallet waiting in front of the respective pallet, the two pallet's gear wheels in the continuously driven transport chain rotate on the spot until the resistance from the pallet in front or the stopping device no longer exists after it has disappeared from the travel path. For this purpose, each gear of a pallet is coupled with a hysteresis coupling or viscous coupling.

The familiar accumulating conveyor of the abovementioned DE 10 2014 106 956 A1 also features two pin-shaped stop elements arranged transversely to the transport direction below each pallet. These stop elements come into contact with a stopping element of a stopping device when it is swiveled from below into the travel path in order to stop the pallet. Several stopping devices can be provided along the accumulating conveyor in the transport direction in order to be able to stop pallets at various points.

On the one hand, the design effort for a swiveling design of the stopping device is quite large, on the other hand, relatively high powers of corresponding drive motors are required for swiveling.

BRIEF DESCRIPTION OF THE INVENTION

It is the object of the present invention to provide a stopping device with lower power consumption with a simple design.

This object is solved by the features of claim 1.

The invention provides for the at least one stopping element to be guided around the stop element at least in sections when moving from the locking position to the release position on a curved or bent path, thereby releasing the stop element and thus the pallet for further conveying. The inventive design offers the advantage, for example, that the at least one stopping element does not have to be swiveled up from below into the travel path of the stop element. In this prior art case, the stopper element has to travel a relatively long distance in order not to be pushed forwards and downwards unintentionally by the lever or the torque of the stop element which exerts force further in the transport direction. Instead, with a suitable geometric design, relatively short paths of the at least one stopping element, namely a short lateral movement around the stop element, are sufficient.

Preferably the at least one stopping element is driven by a motor rotating around an axis of rotation. The at least one stopping element then moves around the at least one stop element at least on a circular path section or on an entire circle, at least in such a way that the pallet can be blocked and released. In principle, small dimensions of the stop element and/or the stopping element and short distances of the stopping element are sufficient to lock or release the corresponding pallet.

It is also advantageous if the at least one stopping element is guided circumferentially on an elliptical path, since in this case no reversing motors have to be used. In an even more preferred variant, the at least one stopping element is guided circumferentially on a circular path around the said axis of rotation. Such a design is easy to implement and offers the advantage of a fixed rotation axis around which the at least one stopping element is guided. In addition, after release of the stop element, the stopping element can return to the locking position while maintaining the same direction of rotation, i.e., carry out a 360° rotation. A reversal of the direction of rotation of the stopping element is not necessary—in contrast to the prior art swivel mechanism.

In an advantageous embodiment, the axis of rotation is inclined towards a horizontal plane. If the angle of inclination is between 0° and 90°, for example in the range of 30° to 75°, the area enclosed by the circular path (defined by the circular path bypassed by the tip of the stopping element) is also inclined. A particularly preferred embodiment, on the other hand, provides for the axis of rotation to run in a vertical direction. In this case, the at least one stopping element rotates the at least one stop element on a horizontal circular path (in the manner of a carousel) to move from a locking position to a release position (or vice versa).

According to another, also preferred variant, the rotation axis runs in a horizontal direction, so that the at least one stopping element rotates the at least one stop element on a vertical circular path in order to move from a blocking position to a release position (or vice versa).

Preferably, the said rotation axis runs through the at least one stop element, if it is stopped by the at least one stopping element, i.e., if the pallet is in the locking position. A particularly preferred special case is when the rotation axis coincides with a longitudinal axis of the stop element. This ensures that the at least one stopping element is guided around the stop element on a circular path with a constant distance to the longitudinal axis of the stop element. If the stop element is of a corresponding geometric design, especially circular in cross-section, the at least one stopping element will slide along the surface of the at least one stop element until it is released for further travel of the pallet. This movement of the stopping element along the stop element is gentle, requires little motor power and enables rapid locking and release of the stop element and thus of the pallet.

In the locking position, the at least one stopping element preferably rests on the stop element at at least two points spaced apart along the circumference, so that the stop element is securely fixed at these two points in the transport direction of the pallet. If the stop element also has a convex, e.g., cylindrical surface, these two points are distributed around the stop element.

The stop element is therein surrounded in sections by the at least one stopping element in order to ensure safe holding in this element and to avoid transverse movements of the locked pallet.

In a particularly advantageous embodiment, the at least one stopping device has two preferably elongated stopping elements arranged next to each other in a locking position transverse to the travel path. Each of these two stopping elements is positioned at at least one point on the stop element, wherein these two points are spaced apart from each other. The two stopping elements form a bottleneck for the stop element, which it cannot pass in the locking position of the stopping elements. If the at least two stopping elements are brought into rotation, they circle around the stop element until first one stopping element and then the other stopping element rotate sideways past the stop element (against the transport direction) so that it is then released. With continued rotation, the two stopping elements return to the locking position. The term "trans-verse to the travel path" is to be understood functionally, i.e., the at least two stopping elements arranged next to each other are transverse to the travel path when they jointly stop the stop element and thus the pallet. The at least two stopping elements arranged next to each other are thus in their locking position in the travel path of the stop element.

In the aforementioned embodiment, the at least two stopping elements are cylindrical and preferably in the form of rotatably mounted round bushings, which roll off on at least one stop element when moving from the locking position into the release position. In this case, the power required from the motor is extremely low, as only the rolling friction between the two round bushings and the stop element has to be overcome. In the case of cylindrical stopping elements which cannot rotate about themselves, the sliding friction must be overcome with at least one stop element, which is also possible according to the invention, but requires more power for these relative movements.

Preferably, at least one stop element should be cylindrical. In accordance with the above, it is advantageous for such an embodiment, if one or more stopping elements, which are also cylindrical and rotate on a circular path around the longitudinal axis of the cylindrical stop element, can move along the cylindrical surface of the stop element. In particular, an embodiment of two stopping elements in the form of round bushings, which are designed as round bushings and roll along the cylinder surface of the stop element, as described above, is particularly suitable. Alternately or additionally, the at least one stop element is designed as a round bush, i.e., it rotates about its longitudinal axis—with the same roll-off effect.

However, a cylindrical design of the stop element(s) is also advantageous for other designs of the stopping element(s).

In accordance with an advantageous embodiment, the at least one stopping element is plate-shaped, which in the locking position envelops the stop element in sections in the plan view. With a special embodiment in this regard, such a stopping element can, for example, be made up of three walls, each running perpendicularly to the other, which, when rotated by 180°, move from a stop position to a release position (and vice versa) for the stop element.

Preferred is that at least one stopping element is arranged on a platform, where it protrudes from the platform, e.g., upwards. The platform is rotated by a motor. The platform is, for example, fitted into a circular disc or designed as a circular disc, which can be set in rotation by means of a drive belt driven by the motor.

The at least one stop element is preferably designed to protrude from the underside of the pallet, preferably at an angle of 90°. Particularly preferably, the at least one stop element protrudes vertically downwards when the pallet is locked and the at least one stopping element protrudes vertically upwards. When the pallet is locked, both elements can rest against each other over a correspondingly large height and thus ensure force distribution over this height.

According to another advantageous variant, the at least one stop element is connected to the underside of the pallet and runs parallel to it, i.e., in a horizontal direction. For this purpose, the stop element can, for example, be attached to the underside of the pallet via a spacer. Preferably, the at least one stopping element in such an embodiment of the stop element is also aligned horizontally and protrudes into the interior of the accumulating conveyor between the upper and lower run. The at least one stopping element then preferably circles the stop element on a vertical circular path in order to release or lock it.

In a preferred embodiment of the inventive accumulating conveyor, two stopping devices are provided, which are spaced apart in the transverse transport direction, arranged opposite each other and mirrored to each other. These two stopping devices are preferably of substantially the same design, one stopping device locking or releasing a stop element arranged on the underside of the pallet and the other stopping device locking or releasing another stop element arranged at a distance from the first-mentioned stop element in the transverse transport direction on the underside of said pallet. The pallet can only continue to move if both locking devices release it at the same time, wherein the locking devices are preferably controlled simultaneously and in the same way by a central electronic control system.

The motor for driving the at least one stopping element can be an electric motor, a pneumatic motor or a hydraulic motor. Depending on the working conditions and customer requirements, the appropriate motor can be selected. In particular, it has been shown that a 24-volt electric motor is sufficient to move stopping elements between locking and release position and to lock the respective pallet most effectively.

All the processes to be coordinated, such as the recognition of the pallet position and the resulting motor control of at least one locking device for locking and releasing the pallets, are preferably implemented by basically known devices. For example, appropriate sensors, e.g., light barriers, are provided to detect the pallet position, wherein the measured values are preferably evaluated in a central machine control for the accumulation conveyor and converted into appropriate motor control signals. The fast return of the at least one stopping element moved into the release position to the locking position is also initiated by the corresponding control of the respective motor by means of the central machine control, so that this locking position is reached before a subsequent pallet can pass the stopping element. Alternative measurement and control concepts are possible without any problems and can be easily implemented by the person skilled in the art.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 7 shows a cut partial front view of a second embodiment with horizontally running stop element and horizontally running stopping elements in locking position, and FIG. 8 shows the same view of the stopping device of FIG. 7 in the release position.

DETAILED DESCRIPTION OF THE INVENTION

Figure 1:
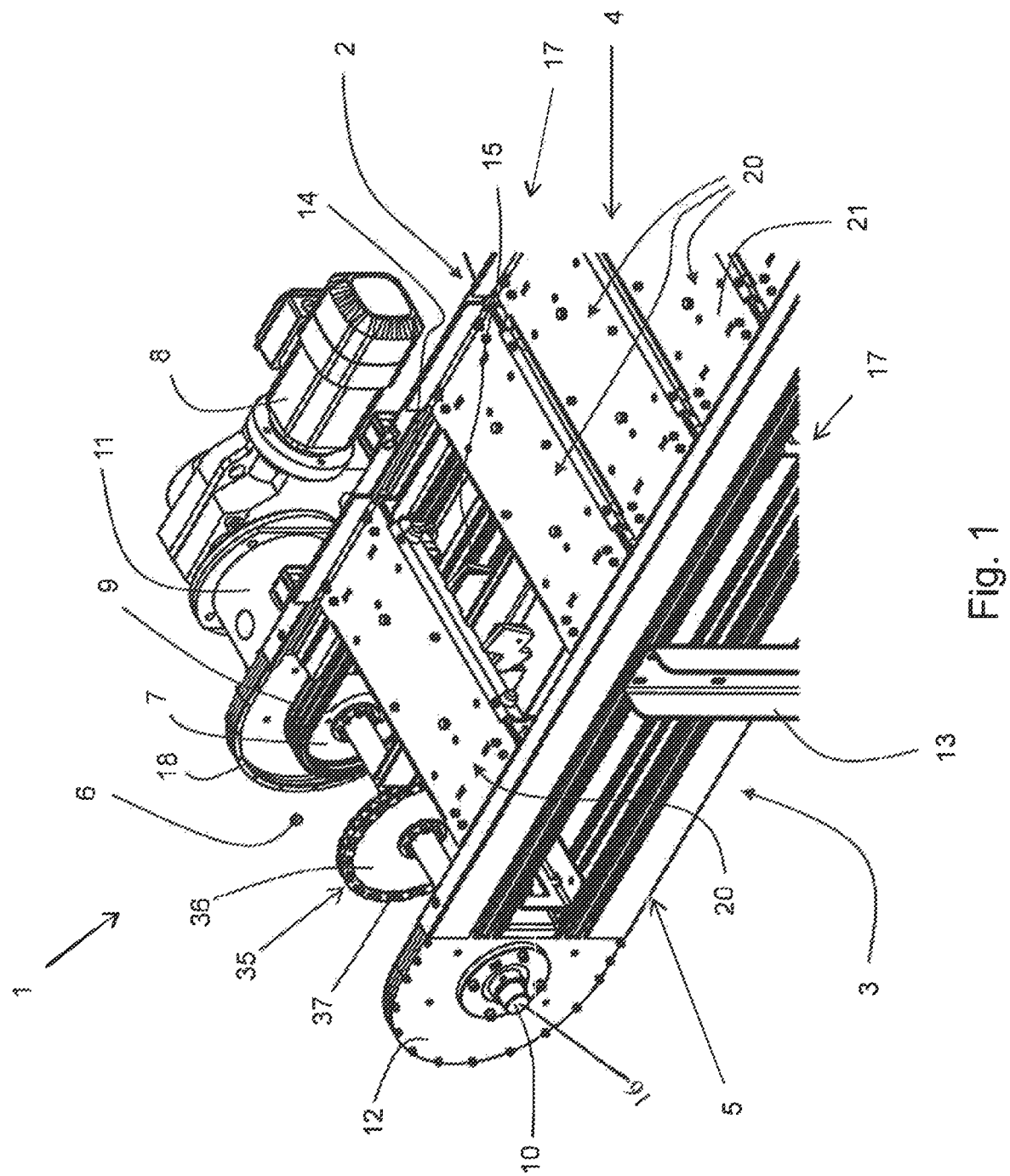
FIG. 1 shows a perspective partial view of an accumulating conveyor with a reversing section.

In FIG. 1 a section of an accumulating conveyor 1 with an upper run 2 and a lower run 3 is shown in perspective from above, which together form an upper conveyor track 4 and a lower conveyor track 5 for pallets 20 one behind the other. The upper run 2 and the lower run 3 are connected at both front ends (only one is shown) by essentially semicircular reverse sections 6. In the upper run 2, two horizontally spaced running rails 14 run parallel to each other, and in the lower run 3, two horizontally spaced running rails 15 run parallel to each other. In each case, a running rail 14 of the upper run 2 is arranged above a running rail 15 of the lower run 3, one such pair of running rails 14, 15 being connected by means of struts of a frame 13. One running rail 14 of each upper run 2 is connected to one running rail 15 of each lower run 3 by a link 18 arranged in each of the reverse sections 6. The accumulating conveyor 1 thus has two side sections 17, in each of which the side sections of a pallet 20 are guided and thus an endless circulation of the pallets 20 is realized. It should also be noted that on the side of the reverse section 6 facing away from the motor 8, a cover 12 is fitted in front of the deflecting element 7.

In the reverse sections 6, in each side section 17, there are also deflecting elements 7 in the form of sprockets mounted on a common shaft 10, which defines a rotation axis 16. The shaft 10 is driven by a motor 8 and an intermediate gear transmission 11. Endless tension elements 9 in the form of three-track endless chains thus run in each side section 17 and take pallets 20 with them, which circulate endlessly in the accumulating conveyor 1. As can be seen from FIG. 2, the pallets 20 have gear wheels 25 for this purpose, which are supported on side plate 24 in the area of the two transverse sides of each pallet 20. The gear wheels 25 are each coupled to a hysteresis clutch 26 which is provided on the side of each side plate 24 facing away from the gear wheels 25. These hysteresis couplings are described in more detail in WO 2004/000698 A1. If no exceptional force is applied to the gear wheels 25, the gear wheels do not rotate in the tension elements 9 but act as rigid latches engaging in the tension elements to propel the pallet 20 forward. If an obstacle, such as a stationary pallet 20 or a stopping device, appears, the gear wheels 25 begin to rotate so that the pallet 20 does not continue to move while the gear wheels 25 rotate in place. Instead of hysteresis clutches 26, other, conventional clutches such as friction clutches can of course also be used.

Figure 2:
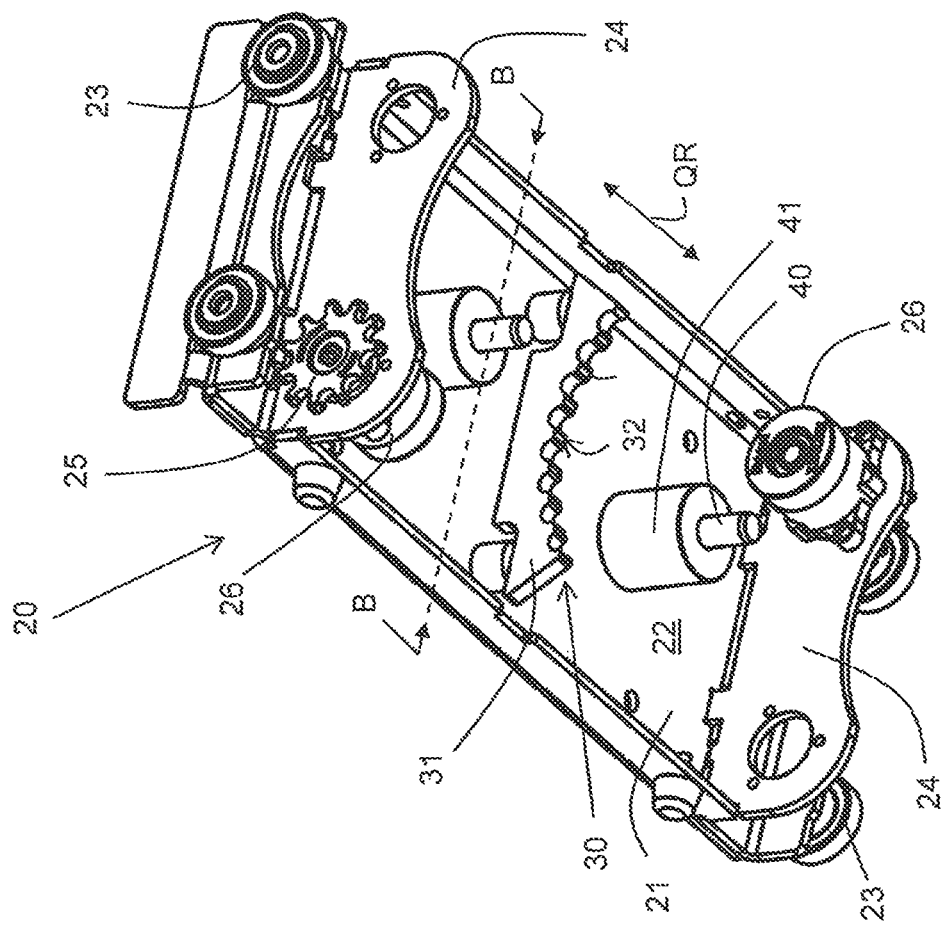
FIG. 2 shows a perspective bottom view of a pallet.

For a smooth running of the pallets 20 in the running rails 14, 15 as well as the link 18, they have a roller 23 on their underside 22 in each of the four corner areas, see e.g., FIG. 2.

As can also be seen from FIG. 2, a first positive locking element 30 is provided centrally on the underside 22 of each pallet 20 for deflecting the pallets 20 in the reverse sections 6, which interacts with a second positive locking element 35 provided in both reverse sections 6. The first positive locking element 30 comprises a rigid component 31 which is elongated and extends in the transport direction of pallet 20. The rigid component 31 has a toothed segment 32 with nine teeth present, which form a concave envelope curve with a constant radius. The second positive locking element 35 comprises a gear wheel 36 according to the present embodiment, which is arranged centrally on the shaft 10 between the two deflection elements 7 and is driven synchronously with them. A chain 37 is tensioned on the gear wheel 36, which preferably has little or no play. When a pallet 20—for example from the upper run 2—is driven into a reverse section 6, a positive fit is produced between the teeth of the toothed segment 32 and the chain 37. Further de-tails on this embodiment are disclosed in the DE 10 2014 106 956 A1 mentioned at the beginning.

On the underside 22 of each pallet 20 there are two stop elements 40 spaced in the transverse transport direction QR and arranged on both sides of the first positive locking element 30. The cylindrical stop elements 40, which are preferably made of a metal, project vertically downwards from the underside 22 of pallet 20 (with pallet 20 running on the upper run 2). Furthermore, the stop elements 40 are each enclosed centrally in likewise cylindrical metallic basic bodies 41 (see FIG. 3), which lie directly against the underside 22 of pallet 20. Each stop element 40 can be firmly connected to the base plate 21 of pallet 20 with a screw 42 or other fastening means.

As they move forward, the stop elements 40 each collide with one or more stopping elements 51 of an inventive stopping device 50, which is explained in more detail below. The pallet 20 is stopped by means of the stopping device 50, wherein the two gear wheels 25 of the stationary pallet 20 then begin to rotate when the tension elements 9 continue to run.

Figure 3:
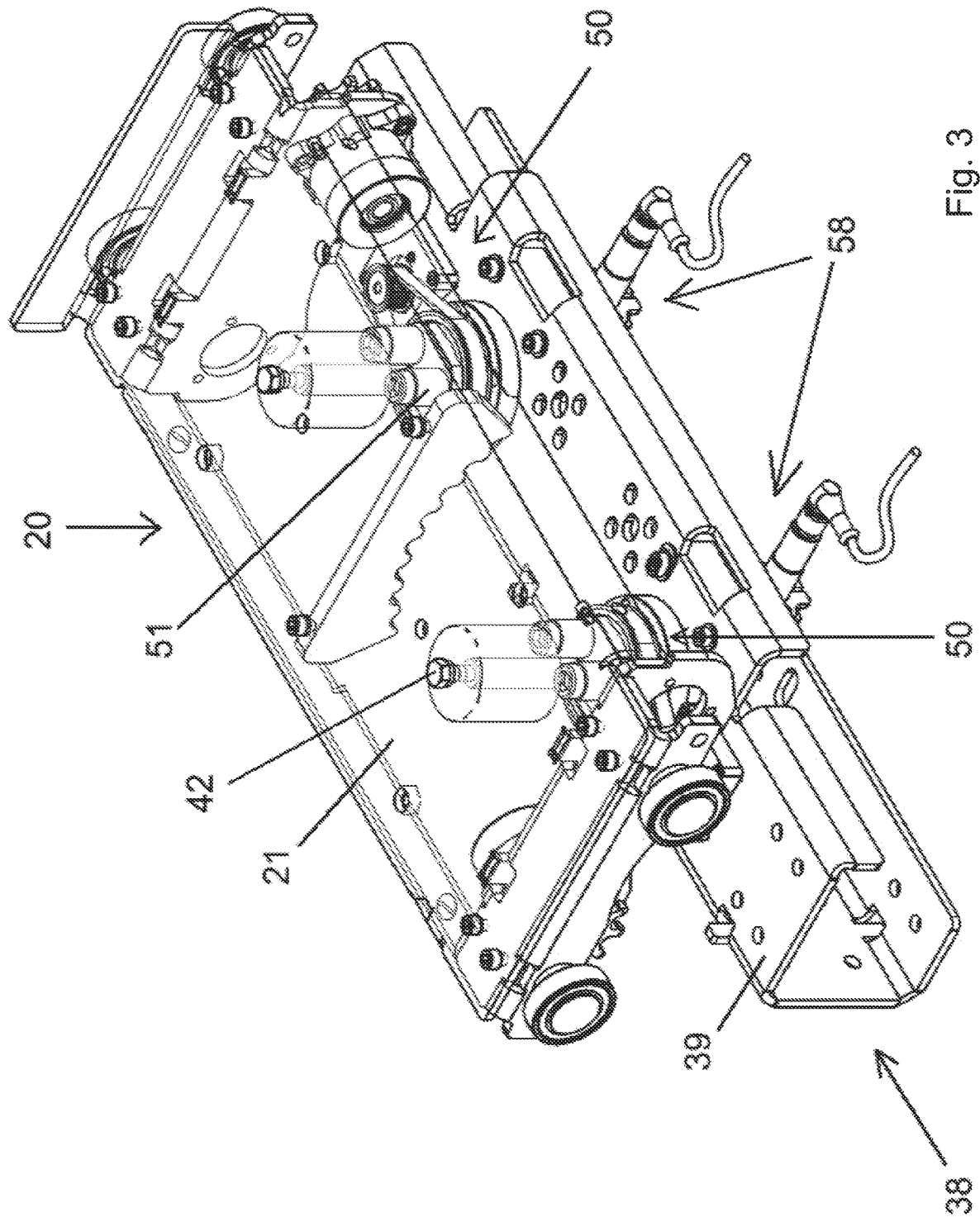
FIG. 3 shows a perspective top view of a first embodiment of the invention with two stopping devices with the pallet indicated above in the locking position.

As can be seen in particular from FIG. 3, two stopping devices 50 spaced in transport transverse direction QR are attached to an upper plate 39 of an essentially C-shaped cross strut 38 of a plate edge construction, which runs between the both side sections 17 and between upper run 2 and lower run 3, in accordance with the exemplary embodiment shown there. Each stopping device 50 comprises a motor 52 designed as an electric motor, which drives an endless drive belt 53. Each of these two drive belts 53 is in turn tensioned around an output disc 54 to rotate it around a fixed, vertically aligned rotation axis 55 by means of a shaft (not shown). In addition, each of the two motors 52 is connected to a central machine control (not shown), which controls the two motors and thus brings the stopping elements 51 into a locking or release position for locking or releasing the stop element 40.

A platform 56 is arranged on each of the two output pulleys disc 54, on which two stopping elements 51, arranged at a distance from each other, are fastened and rise vertically. The stopping elements 51 are designed as cylindrical round bushings, i.e., rotatably mounted around their respective longitudinal axis.

Figure 4:
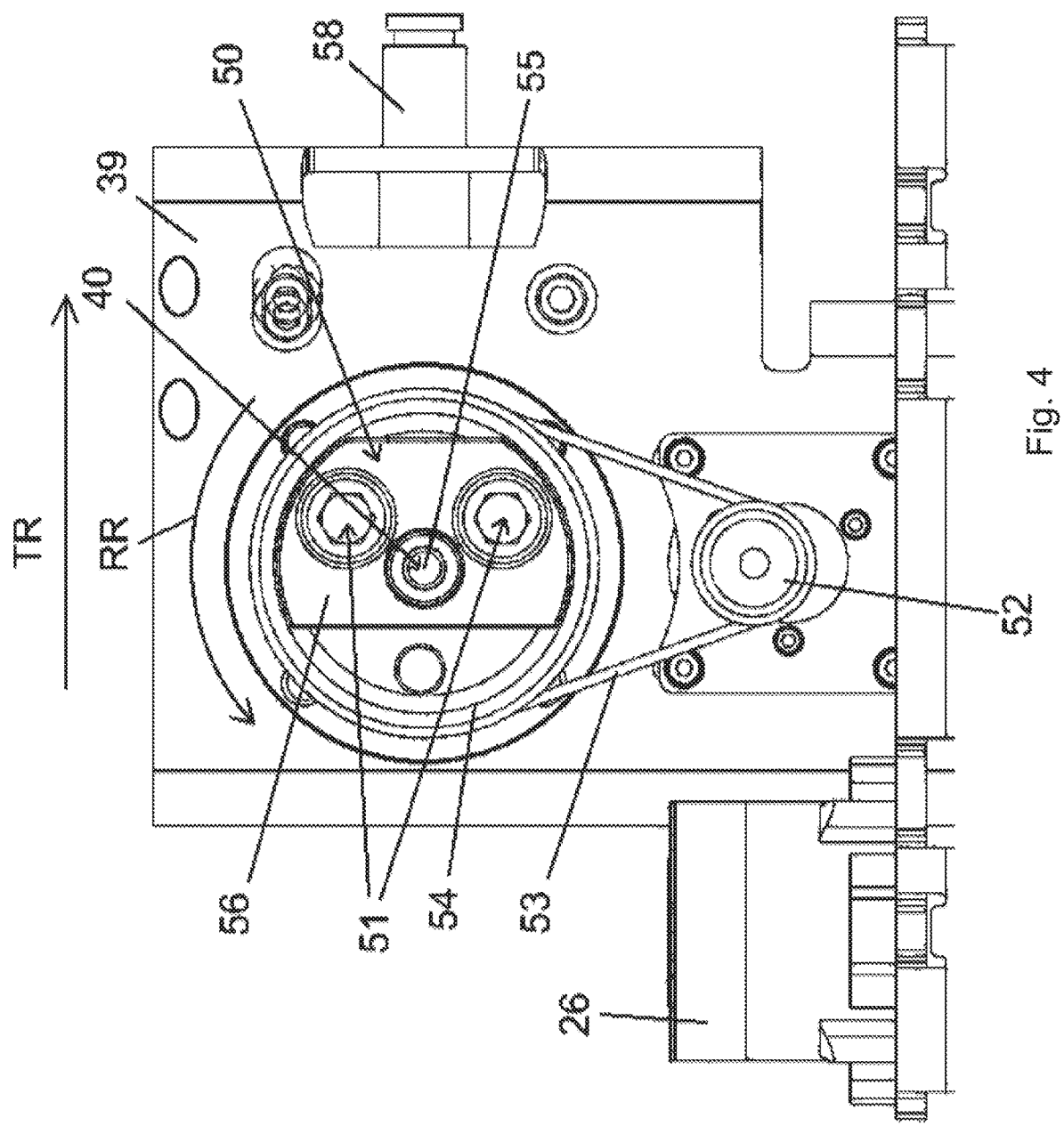
FIG. 4 shows a top view of a stopping device according to FIGS. 2 and 3 in locking position (base plate of pallet not shown)
Figure 5:
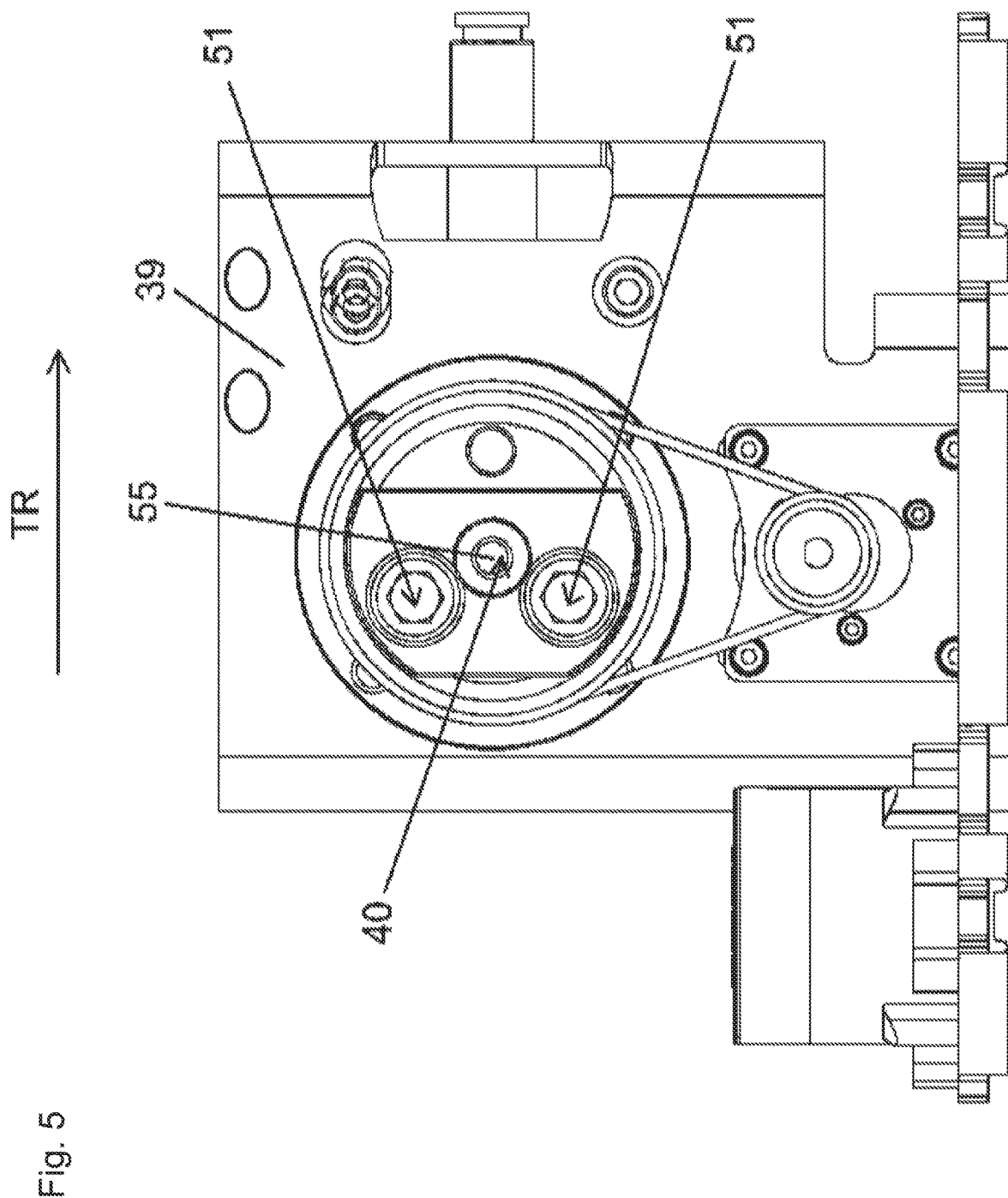
FIG. 5 shows a plan view of the stopping device of FIG. 4 in the release position.

In the position shown in FIG. 4—FIGS. 4 and 5 each show only one stopping device 50 in plan view without the base plate 21 and the basic body 41—the two stopping elements 51 are in the locking position. Here they are arranged next to each other at the same height, i.e., both are aligned with each other in transport transverse direction QR. The distance between the two stopping elements 51 is smaller than the diameter of the stop element 40, so that the stop element 40 and thus the entire pallet 20 are stopped by the stopping elements 51 in this locking position.

The rotation axis 55 of the output disc 54 coincides with the longitudinal axis of the stop element 40 in the locking position shown in FIG. 4. The stop element 40 is therefore encircled by the stopping elements 51 without being displaced in a transverse direction by the stopping elements 51.

When the two motors 52 are switched on, the two stopping elements 51 rotate together with the output disc 54, moving around the rotation axis 55. The stopping elements 51 roll off the cylindrical outer surface of the stop element 40 and run through a curved path in the form of a circular path. This movement causes the stopping elements 51 to move from the locking position shown in FIG. 4 to a release position shown in FIG. 5. A first release position is already reached when both stopping elements 51 have passed the stop element 40 against the transport direction TR.

For the embodiment shown in FIGS. 3-5, the motors 52 of both stopping devices 50 must be actuated in the same way (synchronously or counter-clockwise) in order to transfer the stopping elements 51 of both stopping devices 50 from the locking position to the release position.

The return of the stopping elements 51 from the/or from a release position to a locking position is preferably carried out by turning the output disc 54 further by the corresponding angle of rotation, so that a final 360° rotation of the output disc results. The corresponding control of the two motors 52 is in turn carried out by the central machine control. According to this exemplary embodiment, each stopping device 50 can be precisely moved into its respective locking position by means of the associated motor 52 on the basis of signals from an inductive sensor 58, in each case. For this purpose, the inductive sensors 58 are arranged on the underside of the upper plate 39 of the cross strut 38 and register a respective sensor flag assigned to them (not shown). For this purpose, each of the two sensor flags is also arranged on the underside of the upper plate 39 at the same level as the respective associated inductive sensor 58 and coupled to the respective associated platform 56 via the shaft mentioned above, through which the axis of rotation 55 runs, so that both the platform 56 and the associated sensor flag rotate about this axis of rotation 55. Each sensor flag is aligned so that it faces the associated inductive sensor 58 exactly when the stopping device 50 is in the locked position. Thus, if each inductive sensor 58 registers that the associated sensor flag is exactly opposite it, the central machine control sends a stop command to the respective motor 52.

The embodiments shown in FIGS. 2-5, and in particular the embodiment of the axis of rotation 55 and the longitudinal axis of the stop element 40 (when in the locking position or in the release position, but not yet moved on) aligned with each other or falling together, require only extremely low power consumption, so that it is sufficient if the motors 52 are designed as 24V electric motors.

FIGS. 6a-6d show different embodiments of stopping elements 51 schematically and in plan view, whereby the stopping elements 51 are shown in their respective locking position with solid lines and in free position in dashed lines.

Figure 6D:
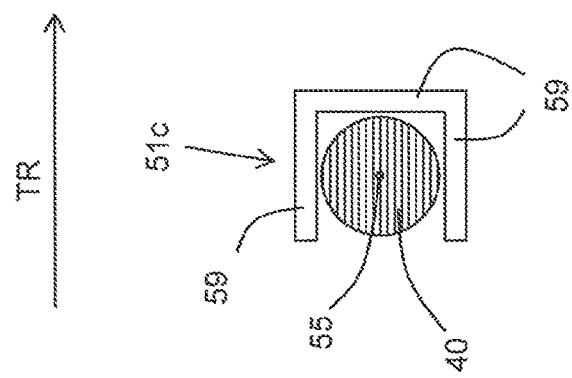
FIGS. 6*a*, 6*b*, 6*c*., and 6*d* show different embodiments of locking elements in locking position, shown in plan view and schematically (as well as dashed in a release position)
Figure 6C:
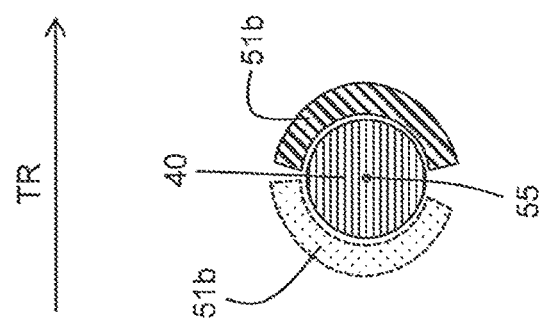
Figure 6B:
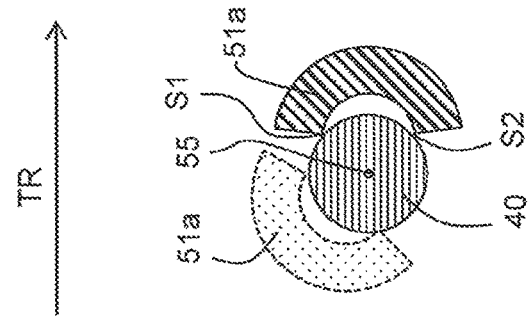
Figure 6A:
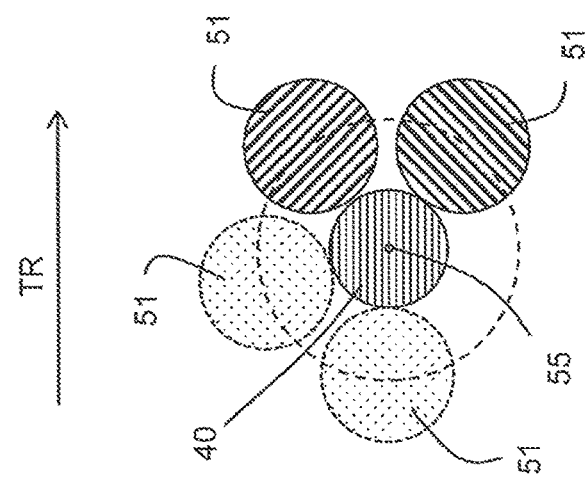

The embodiment according to FIG. 6a corresponds to that of FIGS. 3-5: The two cylindrical stopping elements 51 are arranged at a distance from each other and block the stop element 40 (and thus the pallet 20) from continuing in the transport direction TR. The stop element 40 is released when both stopping elements 51 are rotated by approximately 150° around the rotation axis 55 as shown here. Here the stopping elements 51 roll off the cylinder surface of the respective stop element 40. A further rotation in the same direction of rotation or in the opposite direction brings the stopping elements 51 back into a locking position.

The embodiment according to FIG. 6b has only one stopping element 51a, which is designed as a hollow cylinder section and in the locking position rests with two edges at different points S1, S2 along the circumference of the stop element 40. In order to achieve this, the inner radius of the hollow cylinder section is smaller than the radius of the stop element 40. The stopping element 51a, which is rotated into a release position around the axis of rotation 55, is shown dashed again.

FIG. 6c shows a further embodiment of a stopping element 50b, which in turn is designed as a hollow cylinder section, although the inner radius of this hollow cylinder section corresponds to the radius of the stop element 40, which in turn is designed as a cylinder. For this reason, the hollow cylinder section with its entire convex surface lies on the outside of the stop element 40. When rotating around the rotation axis 55, the stopping element 50b can be brought into the dashed release position—and also back into the locking position.

The embodiment of FIG. 6d shows in plan view a stopping element 51c with three walls 59 arranged perpendicular to each other, which form a kind of cage open on one side for a stop element 40. When turned 180° around the rotation axis 55, the stopping element 51*c* moves into the release position and can then be rotated back into the locking position.

FIGS. 7 and 8 each show cut partial front views of a second embodiment with horizontally running or aligned stop element 40 and two horizontally running or aligned stopping elements 51 in locking position or in release position. The stop element 40 is connected to the pallet 20 via a spacer 43 attached to the underside 22 of the pallet 20 and projecting downwards from this by means of a screw 42 only indicated. Furthermore, by means of fastening elements 57*a*, a support piece 57 with a C-shaped cross-section and bridging the two rails 14, 15 is provided, to which the stopping device 50 with the rotatable platform 56 and the two stopping elements 51 located thereon is fastened, which are arranged in the travel path of the stop element 40 when the pallet 20 travels. The platform 56 is rotatably mounted in a bearing block 56*a*, which is attached to the support piece. The stopping device 50 according to FIGS. 7 and 8 is basically designed according to the first embodiment of FIGS. 2-5, except that the two stopping elements 51 are now aligned or run in a horizontal direction. In FIG. 7 the two stopping elements 51 have moved into their locking position, i.e., in front of the stop element 40, while they are in the release position according to FIG. 8 after a circular path of 180° (see the direction of rotation f1 indicated by a double arrow in FIG. 7), so that the pallet 20 can continue to move (in the direction of the observer).

In FIGS. 7 and 8, only in the area of one transverse side of a pallet 20 is a stop element 40 and an opposite stopping device 50 fixed to the rails 14, 15 provided. It is possible that in the area of the other transverse side of the pallet 20 a corresponding stop element 40 and a corresponding stopping device 50 fixed to the opposite rails 14, 15 are also provided.

Not shown in any of the figures are sensors advantageously provided for determining the positions of pallets 20 along their path in the accumulation conveyor 1. The sensors can give corresponding signals to a central machine control, which then activates the motors 52 in order to transfer the stopping elements 51 from one or more stopping devices 50 either from a locking position to a release position or vice versa. It is of course possible that several stopping devices 50 are provided along the travel path to prevent pallets from continuing their journey at different locations.

The invention was explained in more detail using exemplary embodiments. However, as far as possible, the features of the different embodiments to create new embodiments that belong to the invention can be combined. In addition, the invention also includes modifications within the claims. For example, it is of course possible that only one single stop element 40 is provided on the underside of the pallets, and that only one single stopping device 50 is provided for locking and releasing a stop element 40 and thus the corresponding pallet 20. This can, for example, be designed as in FIGS. 3 and 4 or FIGS. 7 and 8, i.e., without a further stopping device 50 on the underside of pallet 20.

REFERENCE SIGN LIST

1—Accumulating conveyor
2—Upper run
3—Lower run
4—Upper conveyor track
5—Lower conveyor track
6—Reverse section
7—Deflecting element
8—Motor
9—Tension element
10—Shaft
11—Gear transmission
12—Cover
13—Frame
14—Running rail
15—Running rail
16—Rotation axis
17—Side section
18—Link
20—Pallet
21—Base plate
22—Underside of the pallet
23—Rollers
24—Side plate
25—Gear wheel
26—Hysteresis clutching
30—First positive locking element
31—Rigid component
32—Toothed segment
35—Second positive locking element
36—Gear wheel
37—Chain
38—Cross strut
39—Upper plate of the cross strut
40—Stop element
41—Basic body
42—Screw
43—Spacer
50—Stopping device
51—Stopping element
51*a*—Stopping element
51*b*—Stopping element
51*c*—Stopping element
52—Motor
53—Drive belt
54—Output disc
55—Rotation axis
56—Platform
56*a*—Bearing block
57—Support piece
57*a*—Fastening elements
58—Sensor
59—Wall
TR—Transport direction
QR—Transverse transport direction
S1—Resting position
S2—Resting position
f1—Direction of rotation

What is claimed is:

1. An accumulating conveyor for conveying piece goods on pallets, the accumulating conveyor comprising:
an upper run that forms an upper conveyor track;
a lower run that forms a lower conveyor track;
a reverse section that connects said upper run and said lower run;
a deflecting element in said reverse section and connected to a first motor;
an endless tension element in driving engagement with said deflecting element;
a pallet entrained by said endless tension element to circulate therewith;
a stop element on an underside of said pallet;
a stopping device between said upper run and said lower run and driven by a second motor;

wherein said stopping device has a locking position in a travel path of said stop element for stopping said pallet on said upper conveyor track, and said stopping device has a release position for releasing said stop element and thus said pallet for further conveying along said upper conveyor track;

wherein said stopping device comprises a plurality of stopping elements; and wherein each of said stopping elements moves around said stop element on a curved path between said locking position and said release position and said stopping elements bear against at least two spaced-apart places in a circumference of said stop element when said stopping device is in said locking position.

2. The accumulating conveyor as in claim 1, wherein said second motor rotates said stopping device about a rotation axis between said locking position and said release position.

3. The accumulating conveyor as in claim 2, wherein said second motor rotates said stopping device on an elliptical path about said rotation axis.

4. The accumulating conveyor as in claim 2, wherein said rotation axis extends in the horizontal or vertical direction.

5. The accumulating conveyor according to claim 2, wherein said rotation axis extends through said stop element when said stopping device is in said locking position.

6. The accumulating conveyor as in claim 5, wherein said stop element has a longitudinal axis and said rotation axis coincides with said longitudinal axis when said stopping device is in said locking position.

7. The accumulating conveyor as in claim 1, wherein said stopping device comprises a plurality of elongated bushings arranged transverse to said travel path when said stopping device is in said locking position.

8. The accumulating conveyor as in claim 1, wherein said stopping device comprises a plurality of rotatably mounted round bushings which roll off said stop element when said stopping device moves from said locking position to said release position.

9. The accumulating conveyor as in claim 1, wherein said stopping device is plate-shaped and envelops said stop element in sections when said stopping device is in said locking position.

10. The accumulating conveyor as in claim 1, further comprising a platform rotatably driven by said motor, and said stopping device is arranged on and projects from said platform.

11. The accumulating conveyor as in claim 1, wherein said stop element is cylindrical.

12. The accumulating conveyor as in claim 1, wherein said stop element projects from said underside of said pallet at a 90° angle to said pallet.

13. The accumulating conveyor as in claim 1, wherein said stop element projects parallel to said underside of the pallet.

14. The accumulating conveyor as in claim 1, wherein said second motor is an electric motor, a pneumatic motor, or a hydraulic motor.

15. The accumulating conveyor as in claim 1, comprising a plurality of stopping devices spaced apart in a transverse transport direction.

* * * * *